United States Patent [19]
Onoda et al.

[11] Patent Number: 5,875,054
[45] Date of Patent: Feb. 23, 1999

[54] BIDIRECTIONAL OPTICAL AMPLIFIER CIRCUIT

[75] Inventors: Yoshihito Onoda; Terumi Chikama, both of Kawasaki, Japan

[73] Assignee: Fujitsu Limited, Kanagawa, Japan

[21] Appl. No.: 690,794

[22] Filed: Aug. 1, 1996

[30] Foreign Application Priority Data

Sep. 21, 1995 [JP] Japan .................................. 7-242930

[51] Int. Cl.[6] .............................. G02F 1/35; H04B 10/12; H01S 3/131
[52] U.S. Cl. ......................... 359/341; 359/337; 359/177; 359/187
[58] Field of Search .................................. 359/337, 341, 359/160, 174, 177, 187

[56] References Cited

U.S. PATENT DOCUMENTS 5,355,250  10/1994  Grasso et al. ........................... 359/341
5,475,521  12/1995  Heidemann .............................. 359/177

FOREIGN PATENT DOCUMENTS 2094867   4/1993  Canada .
5227102   9/1993  Japan .
5291667  11/1993  Japan .
7015055   1/1995  Japan .

*Primary Examiner*—Nelson Moskowitz
*Attorney, Agent, or Firm*—Helfgott & Karas, P.C.

[57] ABSTRACT

Disclosed is a bidirectional optical amplifier circuit having a function that achieves reliable detection of reflections from an exposed end at low cost. Received optical power is detected; if the detected power is less than a prescribed discrimination level, it is then decided that the detected light is not received signal light but transmitted signal light sent in the direction opposite from it and reflected at an exposed fiber end, and the bias current for a laser diode in the opposite path is reduced to lower the optical output level of an EDF.

12 Claims, 5 Drawing Sheets

5,875,054

BIDIRECTIONAL OPTICAL AMPLIFIER CIRCUIT

BACKGROUND OF THE INVENTION

1. Field of the Invention

The present invention relates to a bidirectional optical amplifier circuit for optically amplifying optical signals transmitted in both directions in a bidirectional optical amplifier repeater or a bidirectional regenerative repeater, or for optically amplifying optical signals transmitted in one or both directions in a bidirectional optical end office.

2. Description of the Related Art

In fiber-optic communication systems using optical amplifiers which directly amplify optical signals, output powers from the optical amplifiers can reach 100 mW or more. In such systems, if the output end of an optical amplifier is exposed for some reason such as a removed connector on the output end, there is a danger that a human eye may accidentally be exposed to the high output light, causing damage to the eye. Also, reflected light at the exposed end may be fed back into the optical amplifier, causing oscillations. It is therefore imperative to provide a protection circuit that can automatically lower the output power of the optical amplifier by detecting the exposure of the output end thereof by some means.

In Japanese Patent Unexamined Publication Nos. 4-324335 and 5-83201, there is disclosed a circuit for detecting the exposure of an output end of an optical amplifier by extracting and detecting light reflected from the exposed end of the output fiber by using an optical coupler provided on the output side of the optical amplifier.

Generally, reflected light is weak; for example, in the case of an optical fiber whose end is PC-polished, light attenuated by about 14 dB due to Fresnel reflection is reflected back into the fiber when the connector is removed. When the connector is fitted, reflections at connected ends still occur, and light attenuated by about 22 dB is reflected back. When detecting reflections, discrimination must be made between these two kinds of reflections.

However, as long as the configuration is employed in which reflected light is extracted for detection on the output side of the optical amplifier, it is difficult to achieve reliable detection of reflected light at low cost, for reasons hereinafter explained.

Reflection detecting means, consisting of an optical coupler and a photodiode, are often integrated into optical circuitry on the output side of the optical amplifier. This increases the chance of stray light entering the detecting means. When detecting reflected light, since the light to be detected is weak, even the slightest amount of stray light can contribute noise, degrading the S/N ratio. Further, in a configuration employing backward pumping in which pumping light is injected from the output side of the optical amplifier, the possibility of stray light further increases since pumping light having a far greater power passes in the vicinity of the reflection detecting means.

Besides stray light, there are other factors that can contribute noise: i) Residual reflections from a collimator at the exit end take the same path as the reflected light from the exposed end and enter the photodiode provided to detect the reflected light. ii) If internal reflections occur in an output light detection photodiode provided to control the gain of the optical amplifier, such reflections pass through the optical coupler and enter the photodiode provided to detect the reflected light. In the present situation, to cope with factor i), parts are strictly selected, and to cope with factor ii), an expensive photodiode having low internal reflection is used. These factors have impeded the reduction of the cost.

Hence, there is a first problem that detection of reflected light is extremely difficult and costly.

For a bidirectional fiber-optic communication system using optical amplifiers, a method has been devised in which a pair of optical amplifiers on the upper and lower transmission lines are pumped using a single pumping laser diode from the standpoint of space, power consumption, cost, etc.; that is, using an optical splitting means such as an optical coupler, the output of the pumping laser diode is split into two approximately equal parts. This method is particularly significant for an optical subscriber system. However, in a transmitter/receiver such as an optical end office, a regenerative repeater, etc., the optical post-amplifier in the transmitting side is required to produce a larger optical power than the optical preamplifier in the receiving side. Hence, there is a second problem that it is difficult to apply this method for such applications.

SUMMARY OF THE INVENTION

Accordingly, it is a first object of the invention to provide a bidirectional optical amplifier circuit having a function that can achieve reliable detection of reflections from an exposed end at low cost.

It is a second object of the invention to provide a bidirectional optical amplifier circuit that is capable of pumping two optical amplifiers by using pumping light emitted from a single pumping laser diode even in applications where different degrees of amplification are required of two optical amplifiers used in a pair as in a receiver/transmitter such as an optical end office or a regenerative repeater.

According to the present invention, there is provided a bidirectional optical amplifier circuit for amplifying at least one of a first optical signal carrying information in a first direction and a second optical signal carrying information in a second direction opposite from the first direction, comprising: a first optical amplifier for amplifying the first optical signal; a first optical duplexer for sending the first optical signal amplified by the first optical amplifier out onto a first optical transmission path, and for extracting selectively the second optical signal transmitted over the first optical transmission path; a first optical detector for detecting the power of the optical signal extracted by the first optical duplexer; and a controller for determining, based on a detection output from the first optical detector, whether reflection from an exposed end has been detected or not, and for reducing the output light power of the first optical amplifier to below a prescribed value when it is determined that reflection from an exposed end has been detected.

According to the invention, there is also provided a bidirectional optical amplifier circuit for amplifying at least one of a first optical signal carrying information in a first direction and a second optical signal carrying information in a second direction opposite from the first direction, comprising: a first optical amplifier for amplifying the first optical signal; a second optical amplifier for amplifying the second optical signal; a pumping light source for generating pumping light; an optical coupler for splitting the pumping light generated by the pumping light source for distribution between the first optical amplifier and the second optical amplifier in such a manner that the power of the pumping light distributed to the first optical amplifier is substantially greater than the power of the pumping light distributed to the second optical amplifier.

DESCRIPTION OF THE PREFERRED EMBODIMENTS

Figure 1:
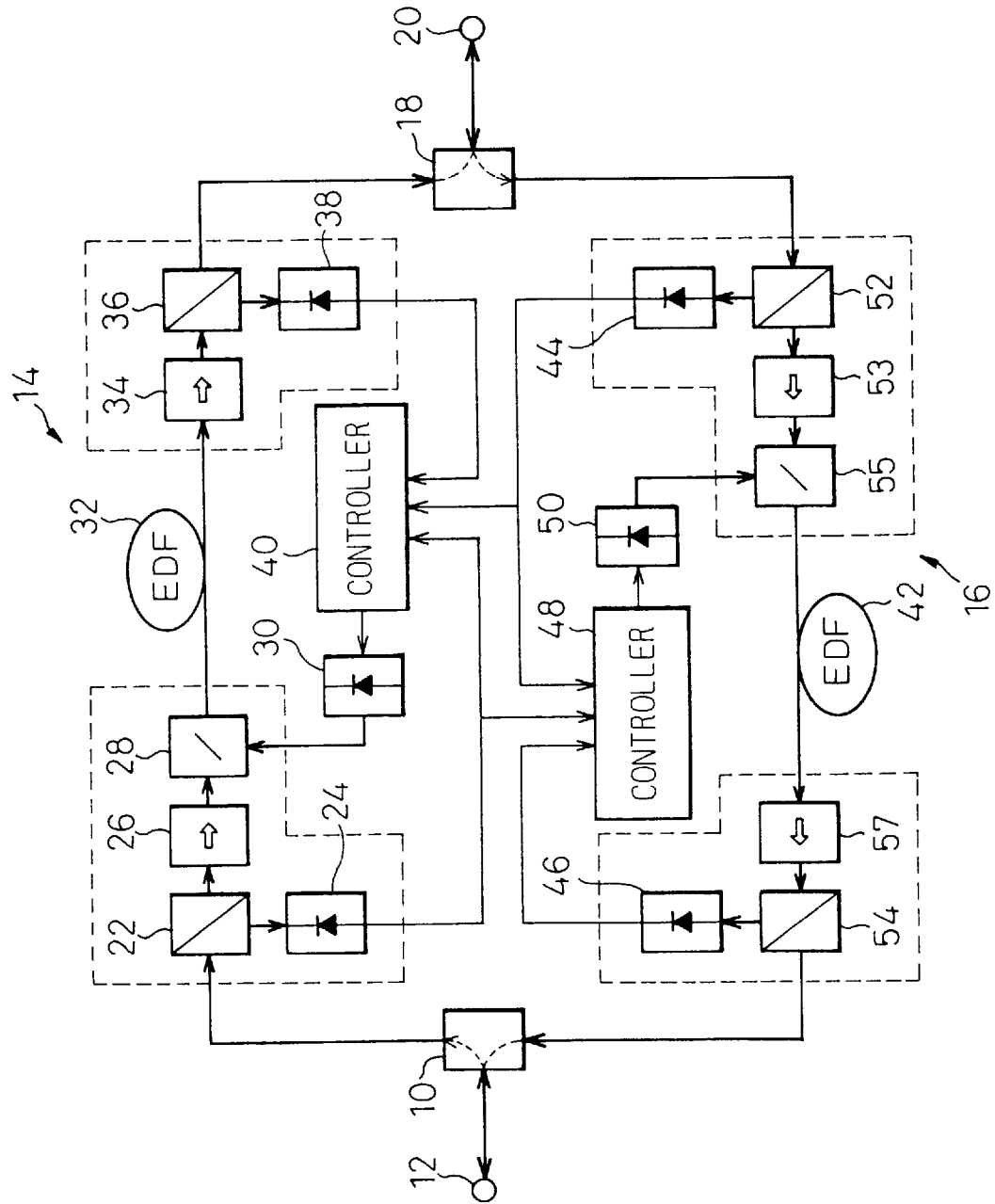
FIG. 1 is a block diagram showing a bidirectional optical amplifier repeater according to a first example of the present invention.

FIG. 1 is a block diagram showing a bidirectional optical amplifier repeater as one example of a bidirectional optical amplifier circuit according to the present invention.

An optical circulator (CIR) 10 selectively delivers an optical signal, received through an optical fiber (not shown) connected to a connector 12, to a line 14 in the upper part of FIG. 1, and an optical signal, output from a line 16 in the lower part of FIG. 1, to the optical fiber connected to the connector 12. Likewise, a CIR 18 selectively delivers an optical signal, received through an optical fiber (not shown) connected to a connector 20, to the lower line 16, and an optical signal, output from the upper line 14, to the optical fiber connected to the connector 20.

Part of the optical signal power brought out by the CIR 10 is split by a beam splitter (BS) 22 constructed, for example, from an optical coupler, and the optical power is detected by a photodiode (PD) 24. A substantial portion of the optical signal passed through the BS 22 is passed through an optical isolator (ISO) 26 and fed into a wavelength-division multiplexer (WDM) 28, constructed, for example, from an optical coupler, where it is mixed with a pumping light beam from a laser diode (LD) 30 before being injected into an erbium-doped fiber (EDF) 32. The optical signal amplified by the EDF 32 is directed through an ISO 34 to a BS 36 where part of the signal is split off, and the optical power is detected by a PD 38. Most of the remaining light is supplied to the CIR 18. That is, the input optical power to the EDF 32 is detected by the PD 24, and the output optical power from the EDF 32 is detected by the PD 38.

Based on the input optical power detected by the PD 24 and the output optical power detected by the PD 38, a controller 40 controls the drive current for the LD 30 so that the output level is maintained constant, thus accomplishing automatic level control (ALC).

The line 16 in the lower part of the figure has the same configuration as the line 14 in the upper part. The input optical power to an EDF 42 is detected by a PD 44, and the output optical power from it is detected by a PD 46. Based on the input optical power and output optical power thus detected, a controller 48 controls the drive current for an LD 50, thus accomplishing ALC.

FIG. 1 and subsequent figures each show a configuration employing forward pumping in which pumping light is injected from the input side of the EDF in the same direction as the optical signal, but it will be recognized that the invention is equally applicable for a configuration employing backward pumping in which pumping light is injected from the output side of the EDF in the opposite direction to the direction of the optical signal.

In the circuit shown in FIG. 1, the controller 40 not only is responsible for the ALC described above, but also serves the function of reducing the output of the EDF 32 by detecting reflected light from an exposed end that occurs when the connecter 20 is removed. To achieve this, a detection output of the PD 44 is supplied to the controller 40. When the connector is connected in place, most of the light incident on the PD 44 is received signal light, but when the connector is removed, light reflected from the exposed end enters the PD 44. If discrimination can be made between the two kinds of lights, removal of the connector can be detected.

The following describes how the light reflected from an exposed end can be discriminated from the received signal light. There are three methods to achieve this, depending on how an inherent problem of the bidirectional communication system is addressed, that is, the way in which reflection of transmitted signal light is discriminated from received signal light.

i) Method utilizing the difference between wavelengths: In a bidirectional communication system, unless crosstalk due to reflection of transmitted light is suppressed, reception may be rendered impossible in the worst case. One method employed to address this problem is to use different wavelengths for transmission and reception. In this case, a filter for separating the two wavelengths is inserted between a point of input light detection by BS 52 and a point of output light detection by BS 54; if there is light detected in the input light detection but not detected in the output light detection, the light is reflected light.

ii) Method utilizing time difference between transmission and reception: Another method employed to solve the problem of crosstalk is to assign different time slots for transmission and reception. For example, time slots t1 and t2 are assigned exclusively to the outgoing line and t3 and t4 to the incoming line, and so on. If there is received light on the incoming line in a time slot assigned exclusively to the outgoing line, then that light is nothing but reflected light, thus making it possible to discriminate it.

iii) Method utilizing difference in reception level: When transmission and reception use the same wavelength and no time division is made between them, reception failure will result unless received light power Pr satisfies $$Pr \gg R \cdot Ps$$

where Ps is the transmitted light power and R is the reflectivity defined by the sum of the amount of reflection on the transmission channel due, for example, to Rayleigh backscattering or the like. Accordingly, the bidirectional communication system is invariably designed to make R very small or make Pr relatively large. The reflectivity when the connector is removed is about −14 dB. Therefore, if there is a sufficient level difference between Pr and $Ps \times 10^{-1.4}$, reflected light can be discriminated from received signal light by providing a discrimination level between the two levels. For example, if Ps=0 dBm and Pr=−10 dBm, the amount of reflection at an exposed end is −14 dBm, which means that reflected light can be detected if the discrimination level is set at −12 dBm. That is, when the optical power detected by the PD 44 indicates −12 dBm or more, the controller 40 performs usual control by deciding that the connector is connected in place; on the other hand, if it is less than −12 dBm, it is decided that the connector is removed, and the drive current for the LD 30 is reduced to lower the output of the EDF 32.

The above description has dealt with the controller 40, but it will be appreciated that the same applies to the controller 48 which detects an exposed condition on side of the connector 12 on the basis of the output of the PD 24.

In the circuit shown in FIG. 1, the output of the EDF 32, 42 is increased or decreased by increasing or decreasing the bias current for the pumping light source 30, 50. Alternatively, the fiber output of the pumping light source 30, 50 may be varied by means of a variable optical attenuator or the like, or the output light power of the EDF 32, 42 may be varied directly by using a variable optical attenuator or the like.

Figure 2:
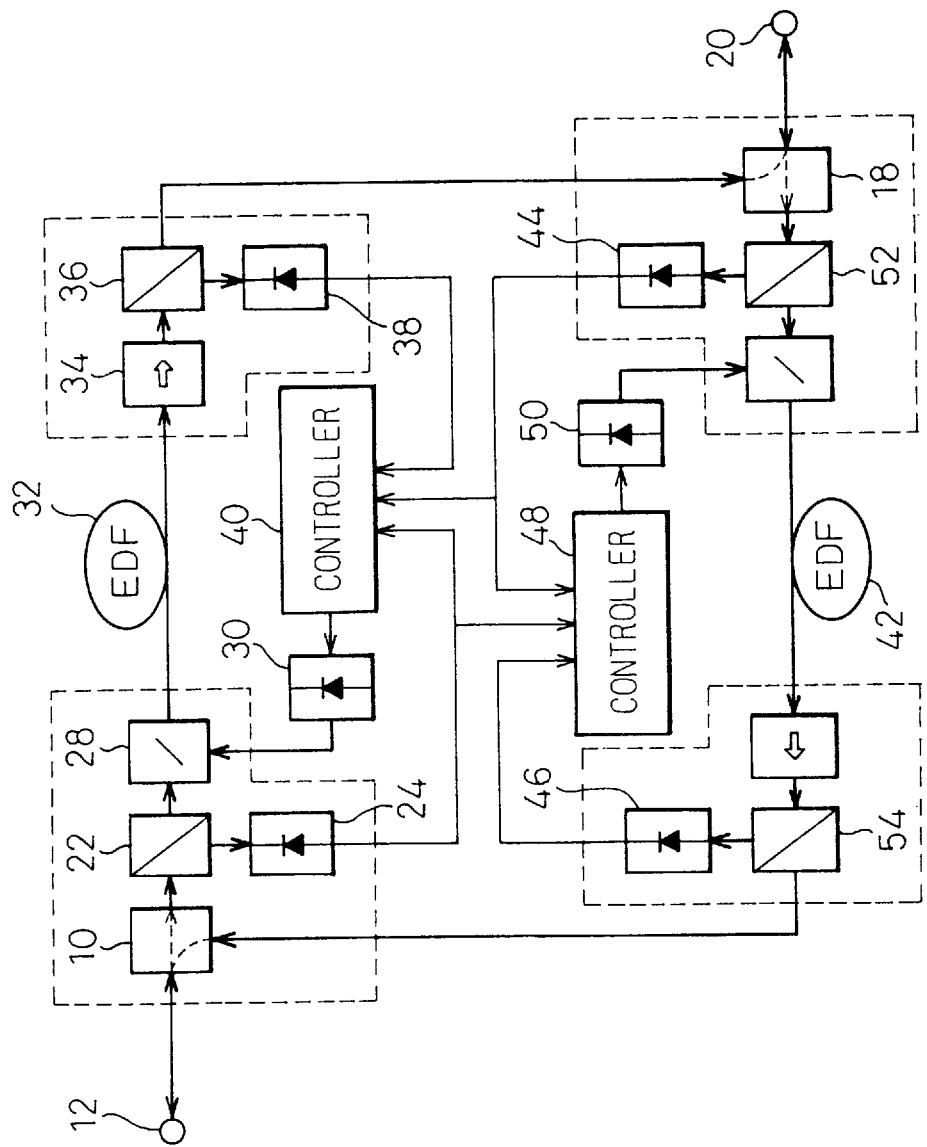
FIG. 2 is a block diagram showing a modified example of the circuit shown in FIG. 1.
Figure 3:
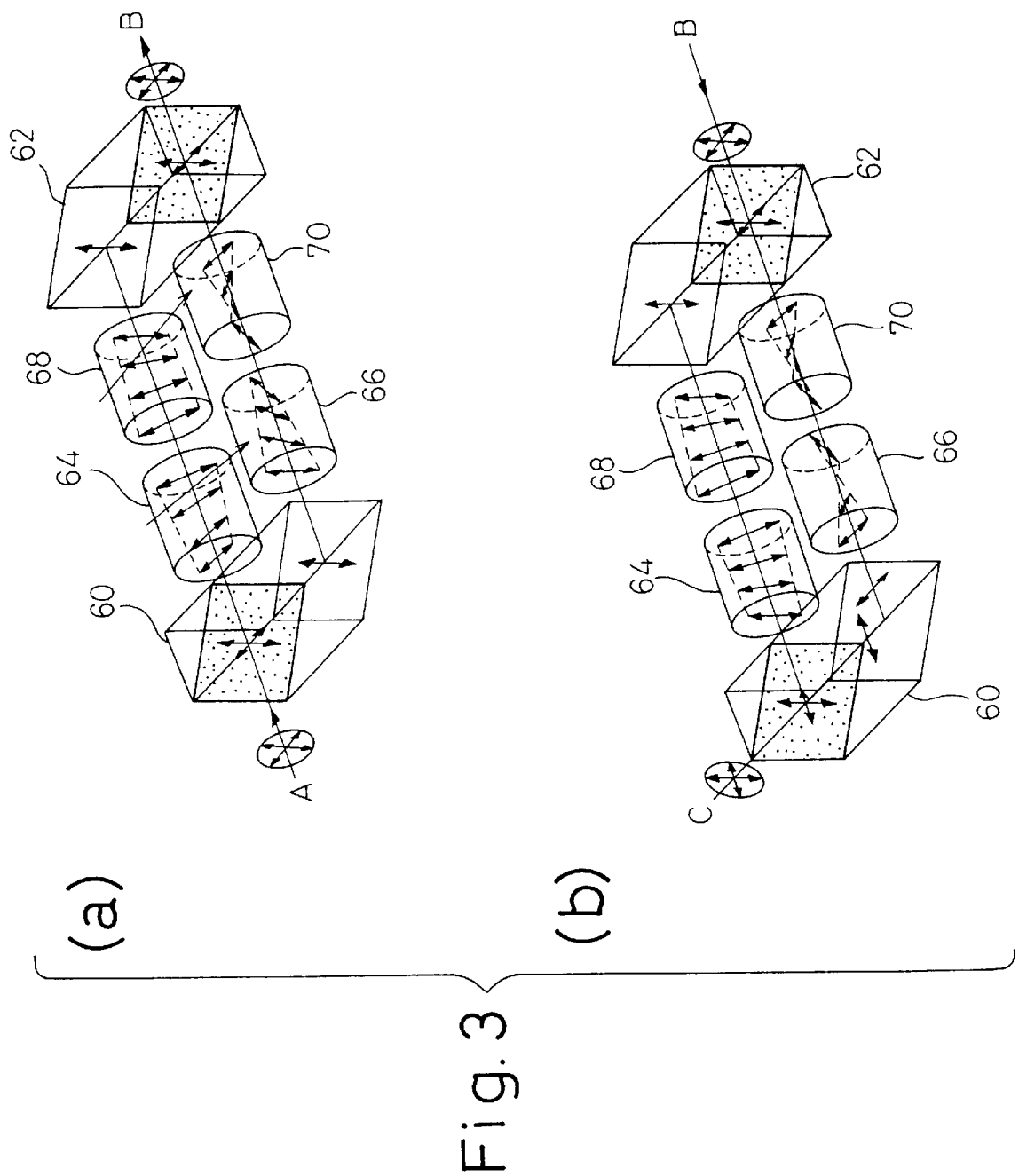
FIG. 3 is a diagram for explaining the construction and operation of an optical circulator.

In the example shown in FIG. 1, even when the connector is not removed, if the input optical power has decreased because of failure to detect the input light due to an open circuit or the like in the section between the optical circulator 18 or 10 and the input light detecting means 52 or 22, respectively, the output light power on the opposite line is decreased. If it is desired to avoid this, either of the following two configurations should be employed.

i) Optical circulators 10 and 18 equipped with a built-in light detection circuit, based on whose output the output light power of the optical amplifier on the opposite line is increased or decreased, are use. Currently available optical circulators are often constructed as a bulk type as shown in FIG. 3 (to be described hereinafter). A beam splitter is inserted in an appropriate position in the light path, for example, in a port for received light, and the light beam separated by the beam splitter is detected using a photodiode.

ii) The beam splitters are directly coupled to the optical circulators: As shown in FIG. 2, the beam splitters 22 and 52 are directly coupled to the respective optical circulators 10 and 18. This configuration eliminates the need for the optical isolators 26 and 53 shown in FIG. 1.

FIG. 3 shows the construction and operating principle of a bulk-type optical circulator as one example of the optical circulator. The optical circulator shown in FIG. 3 comprises two polarizing beam splitters 60 and 62, 45° Faraday rotators 64 and 66, and two polarization rotators 68 and 70. As shown in FIG. 3(a), a beam of light entering through port A is split by the polarizing beam splitter 60 into two polarized beams which are respectively passed through the Faraday rotators 64 and 66 and the polarization rotators 68 and 70 and are combined by the polarizing beam splitter 62 before emerging from port B. On the other hand, as shown in FIG. 3(b), a beam of light entering through port B does not take the same path and emerges from port C, since the Faraday rotators have no reciprocity and the plane of polarization is different by 90°.

Figure 4:
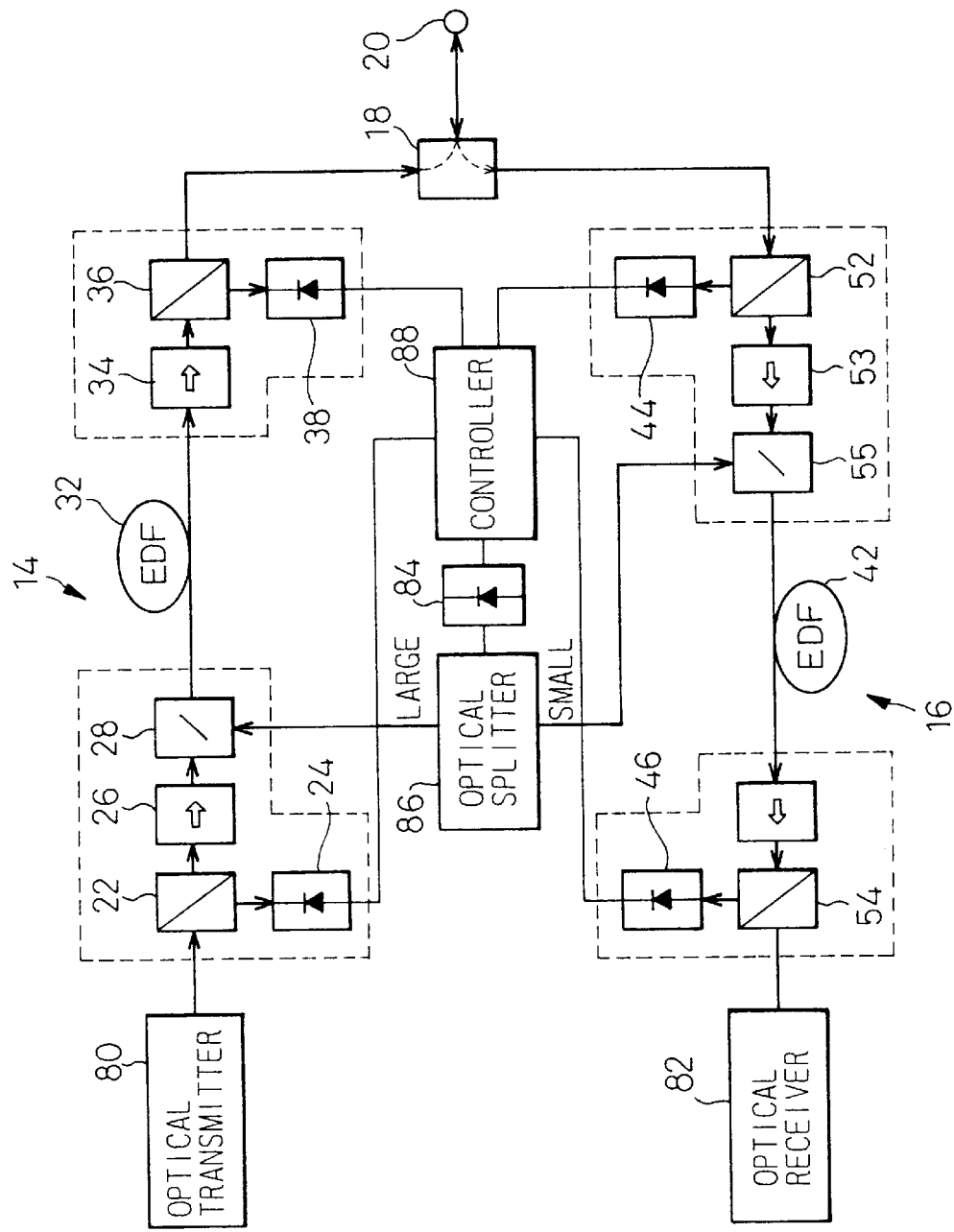
FIG. 4 is a block diagram showing a bidirectional optical end office or a bidirectional regenerative repeater according to a second example of the present invention.

FIG. 4 is a block diagram showing a bidirectional optical end office or a bidirectional regenerative repeater as a second example of the bidirectional optical amplifier circuit according to the present invention. The same constituent parts as those in FIG. 1 are designated by the same reference numerals.

An optical signal from an optical transmitter 80 is supplied to the line 14 in the upper part of FIG. 4, while an optical signal output from the lower line 16 is supplied to an optical receiver 82. Pumping light generated by a laser diode 84 is split by an optical splitter 86 and supplied to the WDMs 28 and 55. Unlike the case of the optical amplifier circuit of FIG. 1, in an optical end office or a regenerative repeater the EDF 32 in the transmitting side is required to produce a higher light output than the EDF 42 in the receiving side. The optical splitter 86 is therefore designed to deliver a larger portion of the pumping light to the transmitting side. A controller 88 controls the bias current for the LD 84, based on the detection outputs of the PDs 24, 38, 44, and 46. The circuit may be configured, as in FIG. 1, to reduce the output of the LD 84 when it is determined based on the output of the PD 44 that the connector 20 is removed. It will be noted that the above idea can be applied not only to an optical end office or a regenerative repeater but to an optical amplifier repeater when different degrees of amplification are required for upper and lower lines.

Figure 5:
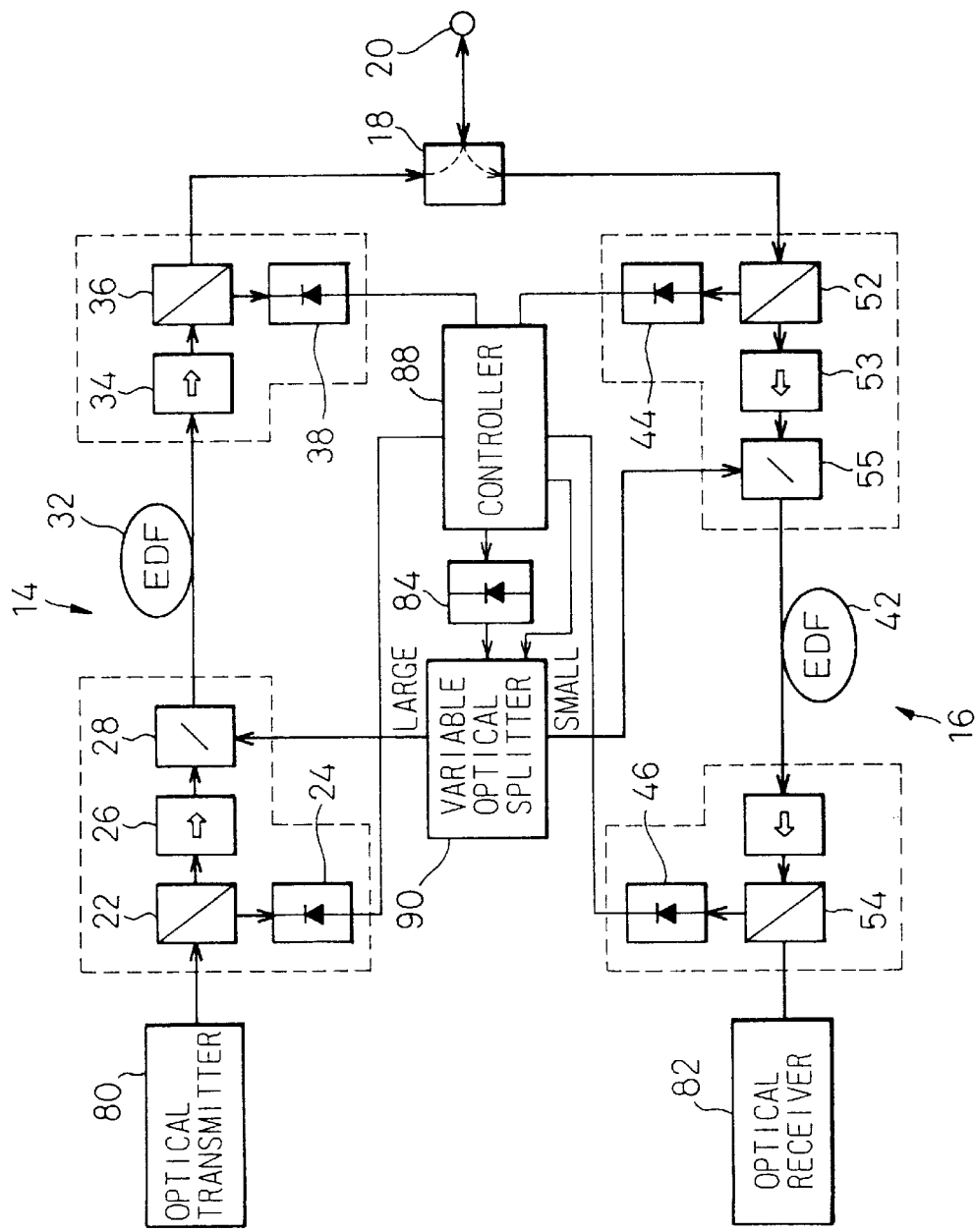
FIG. 5 is a block diagram showing a modified example of the circuit shown in FIG. 4.

As shown in FIG. 5, if a variable optical splitter 90 capable of varying its splitting ratio is used instead of the optical splitter 86 in FIG. 4, the splitting ratio can be controlled so that optimum pumping power is distributed to both the transmitting and receiving sides. The variable optical splitter can be implemented by mechanically moving a member constructed, for example, by evaporating on a base an optical film whose reflectivity and transmissivity progressively vary along its length.

Means for increasing and decreasing the output light power of the EDF 32 can be implemented in two ways: one is by increasing and decreasing the bias current for the pumping light source 84 and the other by inserting a light attenuator midway through the output fiber from the pumping light source. Further, there are two ways to accomplish the latter: one is by inserting the attenuator between the pumping light source and the optical splitter, thus controlling both the transmitting and receiving sides, and the other is by inserting it between the optical splitter and the WDM 28 so that the EDF 42 will not be affected.

According to the present invention, since detection of reflections that tends to degrade S/N ratio is accomplished by detecting incident light on the opposite line, detection can be made with high accuracy and the performance improves. Further, since there is no need to provide reflection detecting means, a cost reduction can be achieved. The elimination of the reflection detection means also contributes to simplifying the optical circuitry on the output side of the optical amplifier, leading to the reduction in the number of processing steps for optical circuit fabrication and also the reduction in the size of the construction.

Since the configuration can be employed that allows the sharing of a single pumping LD between the optical amplifiers in the transmitting and receiving sides, the invention achieves reductions in equipment size, cost, and power consumption.

We claim:

1. A bidirectional optical amplifier circuit for amplifying at least one of a first optical signal carrying information in a first direction and a second optical signal carrying information in a second direction opposite from the first direction, comprising:

a first optical amplifier for amplifying the first optical signal;

a first optical duplexer for sending the first optical signal amplified by the first optical amplifier out onto a first optical transmission path, and for extracting selectively the second optical signal transmitted over the first optical transmission path;

a first optical detector for detecting the power of the optical signal extracted by the first optical duplexer; and a controller for determining, based on a detection output from the first optical detector, whether reflection from an exposed end has been detected or not, and for preventing irradiation into a free space from the exposed end by reducing the output light power of the first optical amplifier below a prescribed value when it is determined that reflection from the exposed end has been detected.

2. A bidirectional optical amplifier circuit according to claim 1, wherein the controller determines that reflection from an exposed end has been detected when the optical power detected by the first optical detector is smaller than a prescribed value.

3. A bidirectional optical amplifier circuit according to claim 2, further comprising
 a second optical amplifier for amplifying the second optical signal,
 a second optical duplexer for sending the second optical signal amplified by the second optical amplifier out onto a second optical transmission path, and for extracting selectively the first optical signal transmitted over the second optical transmission path, and
 a second optical detector for detecting the power of the optical signal extracted by the second optical duplexer,
 wherein the controller reduces the output light power of the second optical amplifier when it is determined, based on a detection output from the second optical detector, that reflection from an exposed end has been detected.

4. A bidirectional optical amplifier circuit according to claim 1, wherein the first optical detector is provided in a light path for the second optical signal within the first optical duplexer.

5. A bidirectional optical amplifier circuit according to claim 1, wherein the first optical duplexer is directly coupled to an input of the first optical detector.

6. A bidirectional optical amplifier circuit according to claim 1, further comprising
 a second optical amplifier for amplifying the second optical signal,
 a pumping light source for generating pumping light, and
 an optical coupler for splitting the pumping light generated by the pumping light source for distribution between the first optical amplifier and the second optical amplifier in such a manner that the power of the pumping light distributed to the first optical amplifier is substantially greater than the power of the pumping light distributed to the second optical amplifier.

7. A bidirectional optical amplifier circuit according to claim 6, wherein the optical coupler has a variable splitting ratio, and the controller controls the splitting ratio in the optical coupler so that the output light powers of the first and second optical amplifiers are respectively maintained at optimum levels.

8. A bidirectional optical amplifier circuit according to claim 6, wherein the controller controls the output light power of the first optical amplifier by controlling a bias current for the pumping light source.

9. A bidirectional optical amplifier circuit according to claim 5, further comprising a variable attenuator provided on an output side of the pumping light source,
 wherein the controller controls the output light power of the first optical amplifier by controlling an attenuation ratio in the variable attenuator.

10. A bidirectional optical amplifier circuit according to claim 6, further comprising a variable attenuator provided on an output side of the first optical amplifier,
 wherein the controller controls the output light power of the first optical amplifier by controlling an attenuation ratio in the variable attenuator.

11. A bidirectional optical amplifier circuit for amplifying at least one of a first optical signal carrying information in a first direction and a second optical signal carrying information in a second direction opposite from the first direction, comprising:
 a first optical amplifier for amplifying the first optical signal;
 a second optical amplifier for amplifying the second optical signal;
 a pumping light source for generating pumping light;
 an optical coupler for splitting the pumping light generated by the pumping light source for distribution between the first optical amplifier and the second optical amplifier in such a manner that the power of the pumping light distributed to the first optical amplifier is substantially greater than the power of the pumping light distributed to the second optical amplifier.

12. A bidirectional optical amplifier circuit according to claim 11, wherein the optical coupler has a variable splitting ratio, further comprising a controller for controlling the splitting ratio in the optical coupler so that the output light powers of the first and second optical amplifiers are respectively maintained at optimum levels.

* * * * *